3,801,564
PROCESS FOR THE PREPARATION OF DES-PHENYLALANINE[B1]-INSULIN

Rolf Geiger, Frankfurt am Main, Germany, assignor to Farbwerke Hoechst Aktiengesellschaft vormals Meister Lucius & Bruning, Frankfurt am Main, Germany
No Drawing. Filed Feb. 5, 1971, Ser. No. 113,097
Claims priority, application Germany, Feb. 7, 1970,
P 20 05 658.0
Int. Cl. C07c 103/52; C07g 7/00; C08h 1/00
U.S. Cl. 260—112.7                              4 Claims

ABSTRACT OF THE DISCLOSURE

Process for the preparation of des-phenylalanine[B1]-insulin by reacting insulin in a mixture of an N,N-dialkyl-carboxylic acid amide, and of an aqueous buffer solution having a pH-value of 8.0 to 9.0, with tertiary butyloxy-carbonyl-azide, reacting subsequently with a phenylisothiocyanate and treating the reaction product with a strong acid.

---

The present invention relates to a process for preparing des-phenylalanine[B1]-insulin wherein the product obtained by reacting insulin with an excess of tertiary butyloxycarbonyl azide at room temperature or slightly elevated temperatures in a mixture consisting of an N,N-dialkylcarboxylic acid amide having a total of 3 to 6 carbon atoms and of an aqueous buffer solution having a pH value of 8.0 to 9.0 is subsequently reacted with 2–4 equivalents of a phenylisothiocyanate unsubstituted or substituted by a negative substituent, and then treating the reaction product with a strong acid, for example trifluoroacetic acid.

Des-phenylalanine[B1]-insulin has hitherto been obtained from fluorescein- or phenyl-thiocarbamoyl[B1]-insulin by Edman degradation. The reaction of insulin with the corresponding isothiocyanates to form the thiocarbamoyl compounds always results in mixtures, since the three amino groups present may react at different speed. These mixtures had to be separated with difficulty by column chromatography in 8 M urea or by gel electrophoresis before obtaining homogeneous compounds by Edman degradation. But this kind of separation is only possible with small amounts and has hetertofore been carried out especially for analytical purposes.

In contradistinction thereto, the process according to the invention may easily be transferred to a larger scale, which is a special advantage of this process.

U.S. Pat. 3,684,791 teaches the production of $N^{\alpha(A1)}$, $N^{\epsilon(B29)}$-di-tert.-butyloxycarbonyl-insulin by the reaction of insulin with a 20- to 75-fold molar excess of tert.-butyloxycarbonyl azide at 20° C. in a mixture of an N,N-dialkyl alkanoic acid amide having from three to six carbon atoms and an aqueous buffer solution having a pH between 8.0 and 9.0, the amount of buffer being at least 2.5 times the amount of insulin, by weight.

It is surprising that the reaction of tertiary butyloxycarbonyl-azide with insulin results, under the conditions mentioned, predominantly in $N^{\alpha(A1)}$, $N^{\epsilon(B29)}$-di-tert.-butyloxy-carbonyl-insulin.

According to the present invention, the free amino group linked to the phenylalanine[B1] is then selectively reacted with a phenylisothiocyanate. When the reaction product is subsequently treated with a strong acid, preferably trifluoroacetic acid, the two tertiary butyloxy-carbonyl groups together with the phenylalanine[B1] (as thiazolinone) are separated at the same time.

As starting material, insulin of different types, preferably bovine or porcine insulin or a mixture of both insulins at any ratio desired, may be considered.

The process according to the invention is for example effected by suspending or dissolving 1 mmole of insulin in 30–70 times the amount by weight of an N,N-dialkyl-carboxylic acid amide which may contain up to about 25% of water. As the dialkyl carboxylic acid amide, there are employed, for example: dimethylformamide, dimethylacetamide, diethylformamide of N-methylpyrrolidone. Subsequently, 20–75 mmoles of tertiary butyloxycarbonyl-azide and a buffer solution in 2.5–4 times the amount by volume, are added and then stirred for 3 to 6 hours at about 35–40° C. As the buffer solution, for example 1 N alkalibicarbonate or alkali phosphate buffers of pH 8.0–9.0 may be employed. The reaction temperature may be raised to about 50° C., but temperatures between about 35 and 40° C. are preferred. The reaction proceeds even at room temperature, but in this case a reaction time of 4 to 6 times longer is required.

For intermediate isolation of the di-tert.-butyloxycarbonyl-insulin, the solution is directly precipitated with ether or first evaporated until dry in vacuo at a bath temperature of not more than 50° C. and then triturated with ether. In order to remove the buffer salts, the reaction product is digested with 5–10 times the amount by weight of 1–2% acetic acid and water and dried in vacuo over $P_2O_5$.

In order to prepare the phenylthiocarbamoyl compound, the product is preferably diluted in about 20–50 times the amount of about 60–95% aqueous pyridine— preferably 80–95%. Then 1.5–4 mmoles of an optionally substituted phenyl isothiocyanate are added. Instead of pyridine, dimethylformamide may also be employed as a solvent. As substituents of the phenylisothiocyanate, negative substituents such as chlorine, nitro or trifluoromethyl may be considered. The solution is stirred for 3 to 20 hours, preferably 3 to 6 hours, at room temperature. The reaction is preferably terminated when the solution gets turbid (indicating beginning denaturation of the reaction product). It is also possible to work at about 40° C. or at 0–10° C. by reducing or extending the reaction time.

When the reaction is finished, the reaction product is precipitated with ether, then preserved for 1–2 hours in about 1–10 the amount by weight of trifluoro-acetic acid, precipitated again with ether and crystallized in known manner at a pH value of 5.0 to 5.5.

The amino acid analysis of the compound shows the expected composition. For the amino acids in question, the following is a typical analysis with glutamic acid as a reference substance.

Glu Calc. 7 Found: 7.00
Gly Calc. 4 Found: 3:98
Phe Calc. 2 Found: 2.06
Lys Calc. 1 Found: 1.01

The des-phenylalanine[B1]-insulin has the properties already known for said compound. Its favorable and special use as a medicament (as an antidiabetic) is based on some physical properties different from insulin, such as the different solubility of the compound.

EXAMPLES

The following examples serve to illustrate the invention. For characterizing the acylated insulins, paper electrophoresis was used (6 hours, 200 volts: in acetic acid/formic acid pH 2: dyeing with bromphenol blue); for controlling the separation of phenylalanine, electrophoresis and an amino acid anaylsis were performed.

EXAMPLE 1

(a) 1 g. (0.167 mmole) of porcine insulin were taken up in 70 cc. of an 80% dimethylacetamide. 1.45 g. (10 mmole) of tert.-butyloxycarbonyl azide and 3.3 cc. (3.3 mmole) of 1 N sodium bicarbonate were added and the whole was stirred for 5 hours at 35° C. Then the solution was concentrated in vacuo at a maximum bath temperature of 50° C. The residue was triturated with ether and 1.275 g. of a saliferous product was obtained which yielded, after digestion with 20 cc. of a 2% acetic acid, 945 mg. of $N^{\alpha(A1)}, N^{\epsilon(B29)}$ - di - tert. - butyloxycarbonyl-insulin (porcine).

(b) This compound was dissolved in 4 cc. of 95% pyridine. 0.0365 cc. of phenylisothiocyanate was added and the solution was stirred for 4 hours at room temperature. Then it was concentrated to a small volume at a maximum bath temperature of 50° C. and the compound was precipitated with ether. Yield: 820 mg. of $N^{\alpha(A1)} \cdot N^{\epsilon(B29)}$-di - tert - butyloxycarbonyl-$N^{\alpha(B1)}$-phenyl-thiocarbamoyl-insulin (porcine).

(c) 820 mg. of the compound prepared according to (b) were preserved for 1 hour in 8.5 cc. of trifluoroacetic acid at room temperature. After addition of 100 cc. of ether, 720 mg. of des-phenylalanin$^{B1}$-insulin (porcine) were precipitated, which could be crystallized at pH 5.0–5.5. The treatment with trifluoro-acetic acid may also be carried out for 10 minutes at 50° C. for 5 minutes under reflux. Phe Calc., 2.00. Found: 2.06.

EXAMPLE 2

1 g. bovine insulin was reacted as in Example 1 and 710 mg. of des-phenylalanin$^{B1}$-insulin (bovine) were obtained. Phe Calc., 2.00. Found: 2.05.

EXAMPLE 3

1 g. of bovine insulin was reacted as in Example 1, but the reaction (b) was carried out for 50 hours at +5° C. in a 85% pyridine. Yield: 695 mg. of des-phenylalanine$^{B1}$-insulin (bovine). Phe, Calc., 200. Found: 2.06.

EXAMPLE 4

1 g. of porcine insulin was reacted as described in Example 1, but the reaction (b) is carried out for 1 hour at 40° C. Yield: 725 mg. of des-phenylalanine$^{B1}$-insulin (porcine). Phe Calc., 2.00. Found: 2.03.

EXAMPLE 5

1 g. of mixed insulin (bovine and porcine) were reacted as described in Example 1, but in reaction (b) 0.3 mmole of 4-nitro-phenylisocyanate was employed. By reacting for 2 hours at room temperature, the corresponding 4-nitrophenylthiocarbamoyl compound was prepared. Yield: 780 mg. of desphenylalanine$^{B1}$-insulin. Phe, Calc. 200.0 Found: 2.02.

EXAMPLE 6

1 g. bovine insulin was reacted as in Example 1, but in reaction (b) 0.4 mmole of 4-chlorophenylisothiocyanate was used. By reacting for 3 hours at room temperature the corresponding 4-chloro-phenylthiocarbamoyl compound was prepared. Yield: 765 mg. of des-phenylalanine$^{B1}$-insulin (bovine). Phe, Calc. 2.00. Found: 2.05.

EXAMPLE 7

1 g. of porcine insulin was reacted according to Example 1, but in reaction (b) 0.3 mmole of 3-trifluoromethyl-phenylisothiocyanate was used. By reacting for 2 hours at room temperature the corresponding 3-trifluoromethyl-thiocarbamoyl compound was prepared. Yield: 770 mg. of des-phenylalanine$^{B1}$-insulin (porcine). Phe, Calc. 2.00. Found: 2.04.

What is claimed is:

1. The method of making des-phenylalanine$^{B1}$-insulin which comprises reacting one equivalent part of $N^{\alpha(A1)}$, $N^{\epsilon(B29)}$-di-tert.-butyloxycarbonyl-insulin with from 2 to 4 equivalent parts of phenylisothiocyanate or a negatively-substituted phenylisothiocyanate, and then treating the reaction product with a strong acid.

2. The method as in claim 1 wherein said strong acid is trifluoroacetic acid.

3. The method as in claim 1 wherein said negatively-substituted phenylisothiocyanate is a chloro-, nitro-, or trifluoromethyl-substituted phenylisothiocyanate.

4. The method of making des-phenylalanine$^{B1}$-insulin which comprises reacting one equivalent part of $N^{\alpha(A1)}$, $N^{\epsilon(B29)}$-di-tert.-butyloxycarbonyl-insulin with from 2 to 4 equivalent parts of phenylisothiocyanate or of a chloro-, nitro-, or trifluoromethyl-substituted phenylisothiocyanate, and then treating the reaction product with from 1 to 10 parts, by weight of said reaction product, of trifluoroacetic acid.

References Cited

Brandenburg et al.: "Protein and Polypeptide Hormones," M. Margoulies, ed., Excerpta Medica Found., Amsterdam, 1969, pp. 482–4, Mills, Biochem. J., 53, 37 (1953).

Stewart, J. M. and Young, 4. D., "Solid Phase Peptide Synthesis," Freeman and Co., San Francisco, 1969, pp. 28–29, QD431.5.S8.

LEWIS GOTTS, Primary Examiner

R. SUYAT, Assistant Examiner

U.S. Cl. X.R.

260—112.5; 424—178.